July 15, 1941. E. W. BRUNDIN 2,249,197
CHEMICAL AGRICULTURE SYSTEM
Filed Dec. 13, 1938  2 Sheets-Sheet 1

Inventor.
Ernest W. Brundin

Attorney.

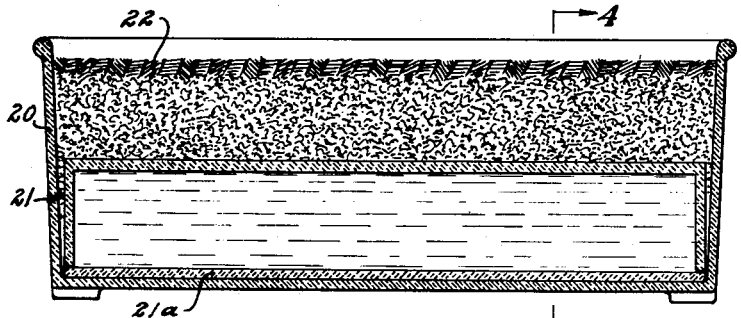
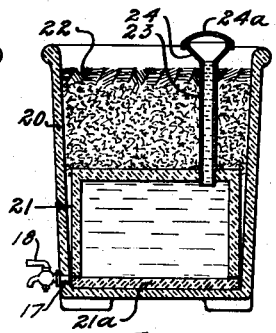
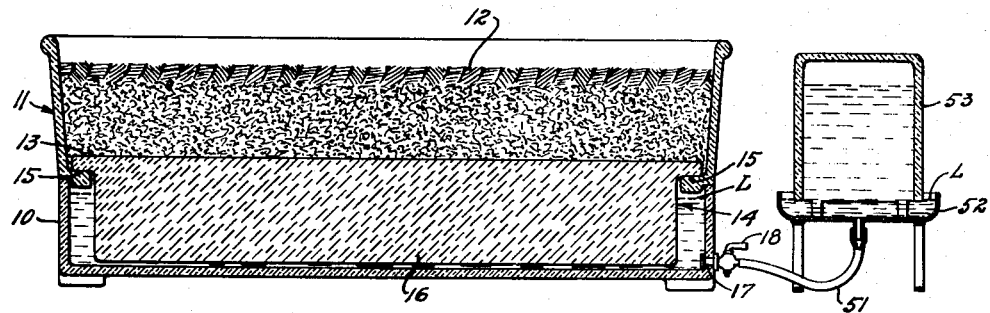
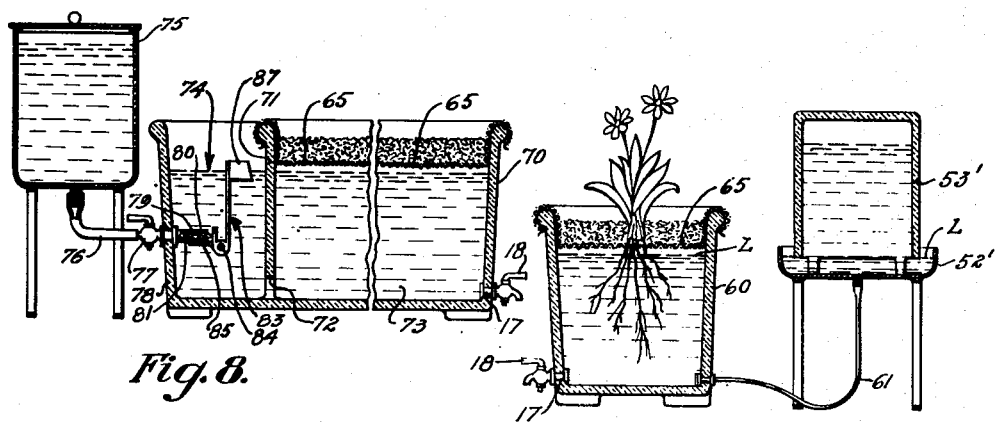

Patented July 15, 1941

2,249,197

UNITED STATES PATENT OFFICE 2,249,197

CHEMICAL AGRICULTURE SYSTEM

Ernest W. Brundin, Montebello, Calif.

Application December 13, 1938, Serial No. 245,430

4 Claims. (Cl. 47—38)

This invention relates generally to the art of growing plants, without the use of soil, by means of "water" or "sand" culture.

Water or sand culture systems as heretofore known, in which the plant roots are bathed in a balanced solution containing nutritive elements in predetermined proportions, involve the necessity of maintaining rather closely the balance between elements, as well as the acidity, or hydrogen ion concentration (pH), of the solution. For example, certain elements of the plant food incorporated in the solution are taken up by the plant more rapidly than others, while the effect of the plant roots themselves, or excretions therefrom, is to upset the desired balance between elements, and also constantly to reduce the hydrogen ion concentration or acidity of the solution, thereby creating a condition at the plant roots which becomes gradually more toxic, until eventually the death of the plant will occur. It has accordingly been the practice to test the solution periodically for mineral content and hydrogen ion concentration, and to correct any unbalance in mineral content, or departure from the proper (pH), that is detected. If satisfactory results are to be obtained, such tests and rebalancing of the solution must be performed every few days. Obviously, this procedure involves close and consistent observation and attention. Moreover, it requires facilities and knowledge ordinarily had only by the specialist in this field.

The general object of the present invention may be stated to be to provide a water or sand culture system in which the difficulties of maintaining balance between nutritive elements, and of maintaining the proper hydrogen ion concentration, are eliminated, or so reduced that successful chemical culture of plants is brought within the skill of the average person.

A further object of the invention is to provide a simplified chemical culture system requiring simple and inexpensive forms of apparatus.

Further objects of the invention have to do with novel forms of apparatus suited to carry on the process of the present invention.

In accordance with the present invention the plant roots are not bathed directly in the full-strength nutrient solution, but are supported in or by a medium, preferably neutral, such as silica sand, cinders, rice-hulls, wood shavings, or other suitable capillary material, or in water, and the nutrient solution is supplied thereto at only a rate equal to the up-take of the plant, plus the small loss due to evaporation from the surface of the root supporting medium (often referred to as the growing medium). A solution of selected mineral salts is used which is of greater hydrogen ion concentration than is required or proper at the plant roots, and which is "out-of-balance" between the various mineral elements, as compared with a standard "balance" solution, the degree of excess of hydrogen ion concentration and the "unbalance" between individual mineral elements being predetermined to compensate closely the conditions constantly tending to be brought about by the growth of the plant. For example, a typical "balanced" nutrient solution as used in conventional water culture systems may be made up in accordance with the following formula:

|  | Ounces |
| --- | --- |
| Calcium nitrate | 12 |
| Potassium nitrate | 7 |
| Potassium acid phosphate | 2 |
| Magnesium sulphate | 3 |

Plus small quantities of micro-elements such as boron, zinc, copper, manganese and iron.

Add water to make 100 gal., and sulphuric acid to bring the hydrogen ion concentration to a pH of 6. Such a nutrient solution is a proper one within which to bath the plant roots, the assumed value of pH being predetermined for the particular plant for which the solution is intended. It is of course understood that the pH value as well as the proportions of salts used may vary somewhat for best results with different types of plants.

Assuming, however, that a pH of 6 is proper for the solution at the plant roots, then, in accordance with the present invention, the solution is brought to a higher acidity, for example a pH of 3.5. Such a value of pH would of course represent a hydrogen ion concentration that would be toxic to the plants if the plant roots were bathed directly in a body of the solution. Of course, if a pH of 6.0 is the determined proper concentration, then any substantially greater concentration (smaller value of pH) when employed in conjunction with a feeding method which supplies the solution only or substantially at the rate taken up by the plant roots, lies within the scope of the present invention, so long as the excess of concentration is not so great that it will not be compensated by the action of the plant. It may be stated, however, that for effective results in accordance with the present invention, the pH value will usually range between the approximate limits of 3 and 4, though with some plants and under some conditions a pH value of approximately 2 may be approached. Typical species grown with a nutrient solution of a pH value within the limits indicated include tomatoes, potatoes, carrots, cucumbers, ferns, begonias, pansies, bulbs, etc.

A preliminary unbalance may also be introduced between the various mineral ingredients of the solution. As an example, if a given plant tends to take up nitrogen at a faster rate than other elements of the solution, then the proportions between the various mineral ingredients of the solution are introduced in such unbalance as to increase the nitrogen content sufficiently to compensate for the faster withdrawal of nitrogen by the plant. In this way, the various mineral ingredients of the solution are preferably introduced in preliminarily unbalanced proportions, the unbalance between the various elements being such as to compensate for the differential rate of feed of the plant on the different elements, all in such manner that the conditions actually existent at the plant roots are brought to and maintained substantially in the predetermined proper balance by the action of the plant roots themselves, such balance as so accomplished being, as one typical example, substantially in accordance with the typical balanced formula given above. Of course, different plants may have different relative rates of feeding on the various elements, and the particular unbalance for a given instance may be related to the specific requirements and feeding characteristics of the particular plant under consideration.

As mentioned in the foregoing, it is essential that the pre-unbalanced solution be fed to the plant only at a rate equal to the up-take by the plant, plus loss by evaporation. Such a solution would, as a matter of fact, be a highly improper one with which to bath directly the roots of the plants, since an acid concentration as high as may be used in the present process would harm or destroy the plants, and the unbalanced solution, if supplied in excess quantity, would constitute a toxic plant food.

By using such a pre-unbalanced nutritive solution, of a predetermined degree of excess acidity, and limiting the rate of supply of such solution to the up-take of the plant, the tendency toward continuous decrease in acidity occurring at and immediately about the plant roots, as well as the tendency toward unbalancing the solution by the selective feeding action of the plants, or possibly by secretions therefrom, just compensate or counter-balance the pre-unbalance and excess acidity of the solution fed. In result, the plant roots feed on a solution which is brought, by the action of the plant roots themselves, to the proper degree of acidity, e. g., pH=6, and to the proper balance between nutritive elements, for best growth. Thus there is fed to the plant, at the rate of absorption by the plant, a plant food in a solution of such unbalance and of such acidity as would be toxic to the roots if the roots were bathed directly therein, but which is of such predetermined unbalance and of such a degree of excess acidity that it becomes balanced, and of proper acidity, on reaching the roots and being affected by the differential rate of feeding of the roots on the different elements and by the secretions from the plants. Of course, as mentioned previously, it is necessary to feed a small extra amount of solution to make up for evaporation at the surface of the root supporting medium, and this is taken into consideration in making up the solution and in adjusting the rate of feed.

The process in accordance with the present invention thus constitutes a method for feeding, at the rate of use of the plant, a solution containing nutritive salts in pre-unbalanced proportions, and of excess acidity, all so predetermined as to neutralize or correct the changes made in the growing medium by the plant itself, thereby maintaining a substantially constant, predetermined proper balance between nutritive elements, and a substantially constant hydrogen ion concentration, about the roots of the growing plant.

It is found in practice that salts tend to collect or concentrate at the surface of the root supporting medium due to evaporation. This is offset, in accordance with the present invention, by washing out the root supporting medium at intervals of from two to four weeks. This step constitutes an important feature of the invention, since if the concentration of salts at the surface of the root supporting medium is neglected, a highly toxic condition develops. A variational method of contending with this condition is to prevent evaporation, or reduce it to a minimum, by use of some suitable material on the surface of the root supporting medium, such as smooth beads of glass or other non-capillary covering.

Reference is now directed to the drawings, showing various typical forms of apparatus in accordance with the invention for carrying the process into practical effect. In the drawings:

Figs. 3 and 4 are longitudinal and cross-sectional views through a modified form of apparatus;

Fig. 6 is a cross section through another modified form of the invention;

Fig. 7 is a cross section through still another modified form of the invention; and Fig. 8 is a sectional view showing another modification of the invention.

Figure 1:
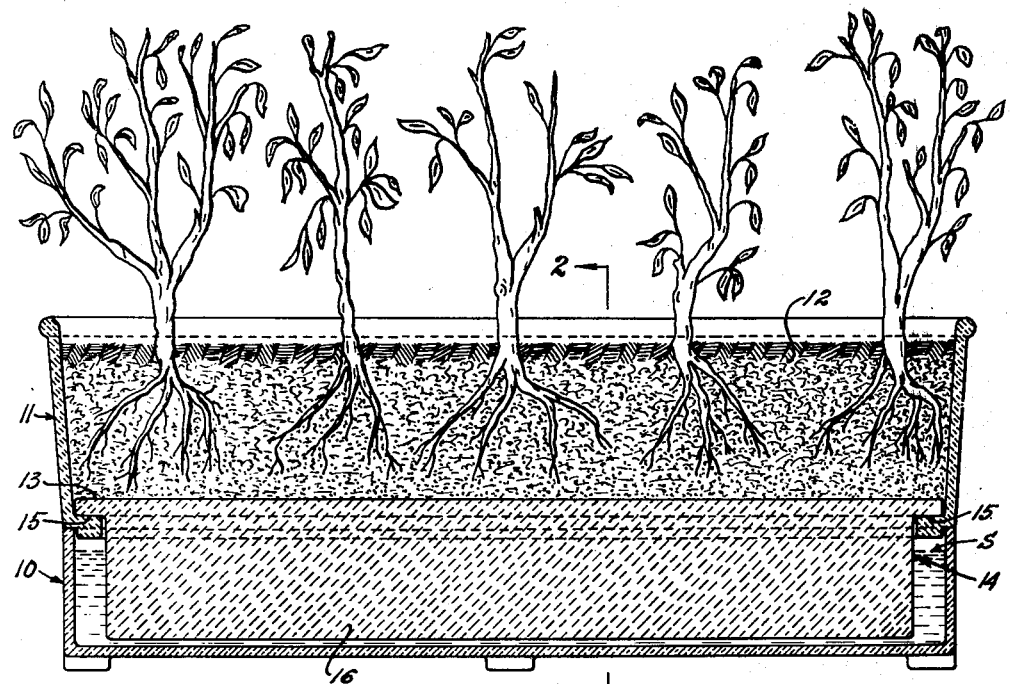
Fig. 1 is a vertical longitudinal section through a self-feeding plant box in accordance with the invention.
Figure 2:
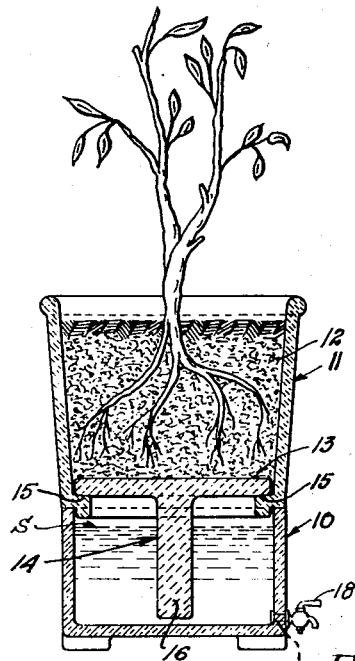
Fig. 2 is a cross section on line 2—2 of Fig. 1.

In Figs. 1 and 2, numeral 10 designates a reservoir for the solution, and numeral 11 designates a container for the root supporting medium, the latter, which may consist of sand, cinders, wood shavings, etc., being designated by numeral 12, and being shown as supported by the horizontal top portion 13 of a substantially T-shaped wick member 14, said portion 13 resting on shoulders at 15 formed inside the lower portion of container 11. Wick member 14 has a depending stem portion 16 which is submerged in the solution "S" contained within reservoir 10. In the illustrative form of apparatus shown in Figs. 1 and 2, reservoir 10 and container 11 are elongated and substantially rectangular, being in what may de described as "window-box" form. It is to be understood, however, that the particular shape or size of the apparatus is immaterial insofar as the instant invention is concerned and the apparatus may range from simple flower-pot size to apparatus of comparatively extended dimensions, such as may be suitable for commercial nursery applications.

Reservoir 10, which is provided in its lower portion with a drain outlet 17, controlled by a valve 18, is of any suitable non-porous material. Container 11 may also be of non-porous material or, if desired, may be of ceramic material. Wick member 14 is formed of any suitable porous, capillary material, for example, porous ceramic, such as will conduct water from reservoir 10 to the capillary material 12 above wick portion 13. The capability for capillary conductivity of a porous wick of the type described is well understood. The rate of capillarity may be controlled by firing the clay to greater or less density by the addition of suitable materials before firing. For example, sawdust may be incorporated in the clay, and is burnt out during firing leaving a ceramic of considerable porosity and capillarity, the degree of which depends upon the proportion of sawdust used. In accordance with the present invention, the cross-sectional dimensions of this wick are made such that the rate at which the solution is conducted from reservoir 10 to the material 12 within container 11 will be sufficient to supply the full needs of the plant plus the amount lost by evaporation from the surface of medium 12. It will of course be understood that the solution conveyed to material 12 by wick 14, rises in material 12 (by capillary action) to the plant roots. The rate of feed through the wick is automatically regulated by the needs of the plant. Thus, as the plant takes up the solution, the capillary material 12 tends to become drier, and capillary conduction through the wick thereupon increases to supply the deficiency of moisture. Oversupply of solution is prevented, since when the capillary material 12 tends to become saturated, capillary conduction through the wick decreases accordingly. The result is that a balance is struck at a point where the capillary flow of solution through the wick just equals the solution taken by the plant plus that lost by evaporation. The rate of supply of solution to the plant is thus automatically governed by the needs of the plant itself, the first depending directly upon the second.

I have discovered that a porous wick such as described acts as a one-way valve, feeding the solution constantly from reservoir 10 to container 11, but preventing back-flow of the solution from container 11 to reservoir 10. This is of importance, since contamination of the supply body of feeding solution within reservoir 10 is thereby prevented. It will of course be understood that any such contamination of the supply body of liquid within the reservoir would interfere with the carefully adjusted proportions and hydrogen ion concentration of the solution introduced to reservoir 10, and would throw off the precise compensation and counterbalancing action obtained in accordance with the process of the present invention.

The outlet valve 18 is provided to facilitate periodic washing out of the apparatus to remove concentration of salts at and near the surface of medium 12. In doing this, valve 18 is opened, and water poured downwardly through medium 12. Wick 14 may be lifted slightly relative to container 11, if necessary, so that the water will pour freely into reservoir 10 and drain by way of outlet 17. However, the wick material is usually sufficiently porous that the water will pour right through it.

Figs. 3 and 4 show a modified form of apparatus in accordance with the invention, designed to prevent the possibility of the liquid level in the apparatus from reaching the plant roots. It will be recalled that the solution employed in accordance with the present invention is of an acid concentration such that the roots cannot be bathed directly therein. The apparatus of Figs. 3 and 4 prevents filling to such a level that the roots would be bathed in the body of solution. In Figs. 3 and 4, the outside container is designated by numeral 20, and numeral 21 designates a closed porous vessel placed in the lower portion of outside container 20. For purposes of construction, the bottom 21a of this vessel may be a separate member, cemented in place. The top side of this porous container or vessel 21 is horizontal, and serves as the support for the root supporting medium 22, which is again some such a material as sand, cinders, etc. A vertical filling tube 23, preferably formed with a flared upper end 24, and shown as provided with a removable cover 24a, extends downwardly through medium 22 and through an opening in the top side of vessel 21, a water tight juncture being provided between tube 23 and vessel 21.

The nutrient solution is fed to the interior of vessel 21 by pouring it into the upper end of filling tube 23. As will be evident, the solution is confined within vessel 21, except for capillary conduction, and when the vessel is full, the liquid level then rises within tube 23, but does not rise in root supporting medium 22. The sides and top of vessel 21 act as a porous wick, in the same manner as described in connection with Figs. 1 and 2. Thus the solution is fed at the rate desired by capillary conduction through the side walls and top of porous vessel 21, but there is assurance that the body of liquid cannot, by overfilling, rise sufficiently that the plant roots will be directly bathed therein.

Figure 5:
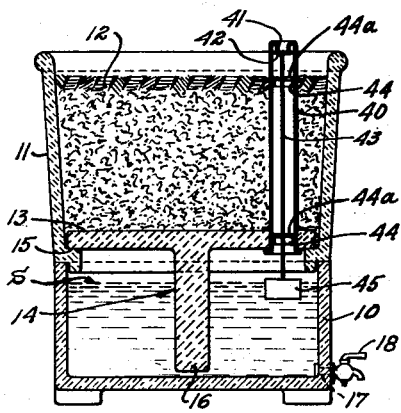
Fig. 5 is a cross section through a further modification of the invention.

Fig. 5 shows another modified form of the invention designed to prevent overfilling. The apparatus in this case may be, in general, of the same type as that shown in Figs. 1 and 2, and corresponding parts of the several figures are accordingly identified by the same reference numerals. The form of Fig. 5, however, is equipped with vertical filling tube 40 extending downwardly through root supporting medium 12 and through an opening in the horizontal top portion 13 of wick 14. The upper end of this tube 40 is formed with an inwardly turned annular portion 41, forming an annular seat against which a valve disk 42 is adapted to seat. This valve disk 42 is disposed inside tube 40 and is mounted on the upper end of a vertical valve stem 43, the latter being guided by suitable guide means 44 placed inside tube 40. Guide means 44 are perforated, as at 44a, to allow for passage of the solution. On the lower end of valve stem 43 is a float 45, adapted to float in the nutrient solution S within chamber 10.

The solution is introduced by pouring it within the upper end of tube 40. When the liquid level rises to a predetermined upper level, float 45 lifts valve stem 43 sufficiently to move valve disk 42 against the annular portion 41 of tube 40, thereby preventing further introduction of solution by way of tube 40.

Fig. 6 shows a modified type of apparatus for feeding the solution to the plant roots, involving a means for establishing and maintaining a constant liquid level within the reservoir at any adjusted height. This feature of the invention is typically illustrated in conjunction with the form of apparatus shown in Figs. 1 and 2. Communicating with the lower portion of container 10 is a flexible liquid feeding tube 51 leading from a shallow pan 52, within which a constant liquid level L is automatically maintained, it being obvious that maintenance of level L in pan 52 will result in flow through tube 51 to maintain the same level in container 10. As a simple means for maintaining liquid level L constant, I indicate an inverted liquid container 53 arranged with its lower end or mouth within pan 52 and containing a supply of solution, as indicated. It is well understood that such a feeding device will maintain a constant liquid level in the pan so long as the liquid supply in the inverted container holds out. Since pan 52 is in communication with vessel 10, it will be evident that the same liquid level L will be maintained in container 10. By using a flexible hose 51 for connection of pan 52 with tank 10, the feeding apparatus 52, 53 may be moved up or down relatively to container 10, thereby adjusting the height of the liquid within tank 10. This has the effect of regulating the submerged area of the wick, and therefore of regulating the rate of feeding from tank 10 to chamber 11.

Fig. 7 shows a further modification of the invention. In this instance, the growing or root supporting medium is water rather than a substance of the nature of cinders, sand, etc. A liquid container 60 is employed, and the lower portion of this container is connected by a small diameter or capillary tube 61 with a feeding device, which may be of the same nature as that described in connection with Fig. 6, consisting of a shallow pan 52' and an inverted container 53'. This feeding device is placed so that the liquid in pan 52' and in container 60 will be at the same level L'. The plants are supported by a bed of some such material as excelsior, carried within an open-mesh basket 65 supported by the edges of container 60. The solution level is maintained slightly below the bottom of the basket and the plant roots extend downwardly through the mesh of the basket into the solution, as illustrated.

The prepared solution, of the same pre-unbalanced type as described previously, is placed in container 53'. When the liquid in tank 60 falls below level L', liquid flow will occur through tube 61 from pan 52' to tank 60. The bore of tube 61 is, however, sufficiently small that under the conditions of use liquid flow in the reverse direction will not occur, so that the supply solution will not be contaminated or diluted. It will be evident that the apparatus in this form will feed sufficient nutrient solution to the water in tank 60 to compensate for the total liquid lost from said tank, including the up-take by the plant, plus the liquid lost by evaporation.

Thus in the form of the invention illustrated by Fig. 7, the prepared solution, of predetermined excess hydrogen ion concentration, e. g., of a pH value of from 2 to 4, is again fed to the growing medium (in this case liquid), and at a rate governed by and substantially equal to the rate of up-take of solution by the plant; and, it being understood that the tank 60 is initially filled with solution of the normal pH requirement for the plant, it will be seen that the alkalinizing effect of the plant roots on the solution in tank 60 will just counterbalance the degree of excess hydrogen ion concentration of the solution fed to tank 60, so that the solution within tank 60 will be held continuously at normal hydrogen ion concentration for the plant, e. g. within the range from 5 to 7. This form of the invention depends upon the rate of feed of solution to the growing medium (liquid) being continuously related to the requirements of the plant, the feed being always at such a rate as will just make up for the loss of solution from tank 60, and the excess hydrogen ion concentration of the fed solution being such that at the plant-controlled rate of feed, the hydrogen ion concentration of the solution at the plant roots, or in other words, within tank 60, is maintained at the point normal for the plant for ideal growing conditions.

Fig. 8 shows a further modification of the invention, illustrating a float-valve system for maintenance of a constant liquid level within the solution reservoir. While this liquid level control means may be applied to any of the forms of apparatus herein shown, it is here typically illustrated in connection with the type of apparatus in which water is used as the growing medium, as in Fig. 7.

In the system of Fig. 8, the reservoir is indicated by numeral 70, and is shown provided, near one end, with a partition 71, which terminates somewhat short of the reservoir bottom, as indicated at 72, thus dividing the reservoir into a growing compartment 73 and a float valve compartment 74, with liquid communication below partition 71. An elevated supply tank 75 is provided, from the bottom of which leads a supply pipe 76 connecting to a spigot 77 mounted in the end wall 78 defining one side of compartment 74. This spigot 77 has connection to a valve sleeve 79 extending within compartment 74, in which sleeve works a fluted valve 80. This sleeve 79 has a valve seat at 81, against which valve member 80 seats when moved inwardly within the sleeve. Valve member 80 is adapted to be so moved inwardly within sleeve 79 by one arm of lever 83, the latter being pivoted at 84 on a bracket 85 mounted in any suitable manner, as on the exterior of sleeve 79.

The other arm of this lever carries a float 87, adapted to float in the solution within compartment 74.

The feeding operation of the device of Fig. 8 is as follows: The normal solution level may be assumed to be as illustrated in the figure. With the solution at this level, float 87 will be at its highest position, with lever 83 holding valve member 80 seated within sleeve 79, and so cutting off feed of fluid from tank 75 to compartment 74. When the solution level falls within compartments 73 and 74, float 87 will descend, lever 83 swinging in a right-handed direction, as viewed in Fig. 8. This permits valve member 80 to move outwardly within sleeve 79, thus becoming unseated and permitting flow of fluid. When the solution level is back up to its original or proper level, float lever 83 will again be back in the position illustrated in Fig. 8, with valve 80 moved to seated position within sleeve 79, thereby again interrupting feeding of solution. The predetermined solution level is thus very accurately maintained. The provision of partition 71 is simply to act as a barrier preventing the plant roots from becoming entwined about float lever 83. It will be appreciated that while this particular type of feeding means has been illustrated in connection with the form of the apparatus of the type of Fig. 7, in which the plant roots are bathed directly in the solution, the feeding system of Fig. 7 may equally well be employed in connection, for example, with the form of apparatus of Figs. 1 and 2, in which the roots are supported by a capillary growing medium, and the solution is fed to such capillary material by means of a capillary wick which is in contact with the solution in the reservoir. It will be evident that in such an application of the invention, the rate of feeding by the capillary wick will, because of the constant liquid level maintained, be very constant.

The system as practiced in each of the disclosed forms of apparatus involves the same principle, namely, feeding to the plant roots, at the rate of up-take by the root, a nutrient solution which is so out-of-balance between nutrient mineral elements, and of such excess hydrogen ion concentration, as compared with the normal requirements of the plant, that the unbalancing and alkalinizing actions of the plant roots will be counterbalanced by said departures from normal balance and from normal hydrogen ion concentration, to the end that the plant actually feeds on a solution which is substantially in balance and of proper hydrogen ion concentration. The tendency for the plant to make the feeding solution more and more toxic as growth takes place is thus obviated, and proper growing conditions are maintained for long periods of time. As mentioned in the foregoing, however, there is a tendency, with most forms of apparatus, for an accumulation of salts near the surface of the growing or root supporting medium, due to evaporation occurring at that surface, and it is an important feature of the invention that the root supporting or growing medium is periodically washed out with water. This procedure, which need only be attended to say at intervals of from two weeks to a month, is very simple and easy to perform, and the entire process, including this periodic restoring or washing-out step, is free from technical difficulty and well within the skill of the average layman.

It will be understood from the foregoing that the process as described involves a compensation for the tendency of the hydrogen ion concentration of the solution constantly to decrease, and also a compensation for the tendency of the plant to feed unequally on different mineral elements of the nutrient solution. However, while, for ideal results with distinct species of plants both such compensations should be made, nevertheless greatly improved results for all plants in general, in accordance with the invention may be accomplished if, for example, only the compensation for the tendency of the hydrogen ion concentration to decrease is made. In other words, in such an instance, a solution which is substantially in normal balance between nutritive elements would be fed (at the rate of up-take of the plant) but the solution would be raised to a predetermined excess of acidity, such that the hydrogen ion concentration of the solution at the roots would be maintained substantially constant at the proper value, in the manner previously explained. In such a case, the aforementioned washing-out step may be required at closer intervals.

I claim:

1. The method of plant culture that includes, supporting the plant with its roots in a substantially neutral growing medium, feeding to said growing medium, and thereby to the roots, at a rate governed automatically by and substantially equal to the rate of up-take by the plant roots, a mineral element solution having a constant hydrogen ion concentration which is sufficiently in excess of the normal requirement of the plant for ideal growth to counteract continuously the alkalinizing effect of the plant on the solution but which is no greater than will permit neutralizing of the excess of hydrogen ion concentration by the plant when fed at a rate substantially no greater than the rate of up-take by the plant.

2. The method of plant culture that includes, supporting the plant with its roots in a substantially neutral medium; and feeding to said medium and thereby to the roots, at a rate substantially equal to the rate of up-take by the plant roots, a nutrient solution having a constant hydrogen ion concentration which is sufficiently in excess of the normal requirement of the plant for ideal growth to counteract continuously the alkalinizing effect of the plant on the solution.

3. The method of plant culture that includes, supporting the plant with its roots in a substantially neutral medium; and feeding to said medium and thereby to the roots, at a rate substantially equal to the rate of up-take by the plant roots, a nutrient solution having a constant hydrogen ion concentration which is adjusted to be between 2 and 4 for a plant having a normal requirement ranging between 5 and 7 for ideal growth, whereby the alkalinizing effect of the plant on the solution is continuously counteracted.

4. The method of plant culture that includes, supporting the plant with its roots in a substantially neutral loose granular capillary medium; and feeding to said medium and thereby to the roots, at a rate substantially equal to the rate of up-take by the plant roots, a nutrient solution having a constant hydrogen ion concentration which is sufficiently in excess of the normal requirement of the plant for ideal growth to counteract continuously the alkalinizing effect of the plant on the solution.

ERNEST W. BRUNDIN.